Patented Jan. 7, 1930

1,742,516

UNITED STATES PATENT OFFICE

HARRY PARKER MILLS, OF TORONTO, ONTARIO, CANADA, ASSIGNOR TO BAKELITE CORPORATION, OF NEW YORK, N. Y., A CORPORATION OF DELAWARE

ORNAMENTAL MOLDED ARTICLE AND METHOD OF MAKING THE SAME

No Drawing. Application filed September 29, 1925, Serial No. 59,422. Renewed April 1, 1929.

This invention relates to molded articles carrying on their surface letters, symbols, designs or ornamentation of any kind, all of which will for convenience be referred to simply as designs. A typical article of this kind is a radio panel, usually comprising a multiplicity of paper sheets, impregnated with a reactive phenol resin and consolidated by hot-press molding: such panels are often required to bear designs as mentioned above, such for example as letters in white or gold. Or in certain cases the entire surface of the panel is ornamented in imitation of natural woods, etc.

In all such cases, so far as I am aware, the distinctive color which marks the design has been applied to the individual molded article, rendering necessary a separate treatment of each article after it leaves the mold; or in case of such surface ornamentation as is last above mentioned, the color design is printed on a sheet, usually of paper, which is thereafter coated or impregnated with the phenolic resin and consolidated with the other sheets by the hot-press molding operation, the ornamented sheet in such case constituting the outermost sheet of the laminated article, or in some cases being even overlaid by an additional transparent or translucent sheet. In all such cases the brilliance and purity of the color is of course lost in part, being obscured by the overlying film of varnish.

According to the present invention I am enabled to avoid both of the foregoing difficulties, and to produce directly from the mold a finished article which bears the design in any desired color, and of which the brilliance is not obscured by an overlying varnish film.

I may accomplish this result in several different ways according to the particular result desired. The following will serve as illustrations of methods in accordance with my invention, although it is to be clearly understood that the invention is not limited to the particular manipulations described:

1. The face of the mold, or in the case of laminated stock the burnished plate of copper or other metal against which the stock is pressed, is engraved in accordance with the desired design. The lines in the mold or metal sheet are then filled with a molding mixture comprising a reactive phenol resin and whatever coloring matter may be desired, such as gilt, bronze, or other metal powder or the like. The engraved copper plate or other die containing this molding mixture is then pressed against the laminated stock to which the design is to be transferred. If this stock is wholly uncured it contains fusible material which causes the lines to blur, since it allows some flow. Accordingly I prefer to partially cure the backing until it reaches a condition where there is no longer sufficient flow to cause blurring, although sufficient plasticity is retained to insure integral union of the design with the base. The engraved plate or die having its lines filled with molding mixture is then pressed against it in the usual manner and the result is a raised design or lettering on the backing, integral therewith, and corresponding to the engraving on the plate. The curing is completed to the extent desired by sufficient application of heat during this pressing operation.

2. The same result may be accomplished by printing the desired lettering or design upon the copper sheet. This printing may be done with a reactive phenol resin molding mixture or "ink" similar to that described above, and the copper may then be applied to the partially cured backing in the same manner.

3. The lettering or design may be printed upon an already impregnated fibrous sheet, with the same type of reactive phenol resin molding mix or ink. This sheet may be partially cured before the printing if desired. It is then backed and pressed in the usual manner.

Highly colored reactive phenol resin molding mixtures, or inks, of the type herein referred to, may be prepared by mixing metal powder or other suitably colored substance with sufficient reactive resin to form a binder.

By the method of applying a design or lettering which I have described clearer and more attractive colors and design effects are obtained. This is important where a design comprising very fine lines is desired, or where it is necessary to produce a predetermined shade of color, since even the most transparent resin will partially obscure the design and darken the color effect.

I claim:

1. An article for use in the molding art, comprising a sheet of reactive phenol resin composition in partially cured, substantially non-flowing, slightly plastic condition, having upon the surface thereof a raised design composed of a distinctively-colored potentially reactive phenol resin composition in a substantially unreacted state.

2. Process of making molded articles having on the surface thereof an integral raised design in distinctive colors and free from overlying films, comprising filling depressed lines or areas of a suitable die with a composition comprising a pigment and a reactive phenol resin, transferring said composition to a phenol resin composition in partially cured state, and simultaneously further curing the composition, whereby integral union is secured without blurring.

In testimony whereof, I affix my signature.

HARRY PARKER MILLS.